July 24, 1928.
W. S. CARLSTON
1,678,327
REGENERATOR MANIFOLD
Filed March 3, 1923
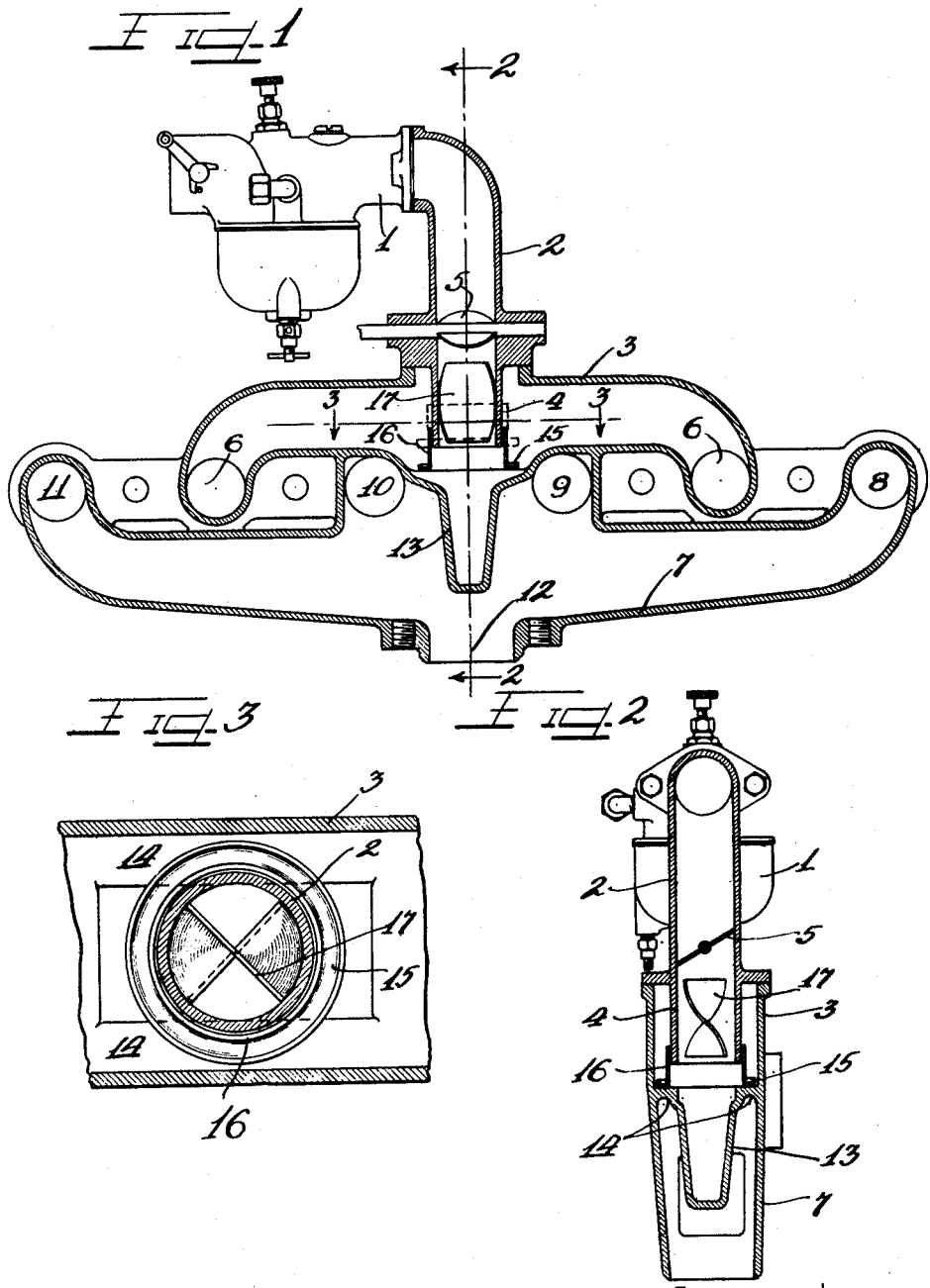
Witnesses
H. G. Marks
Cameron Hill
Inventor
WILLIAM S CARLSTON
by Charles W Hills
Atty.

Patented July 24, 1928.

1,678,327

UNITED STATES PATENT OFFICE.

WILLIAM S. CARLSTON, OF KOKOMO, INDIANA, ASSIGNOR TO BYRNE, KINGSTON & CO., A CORPORATION OF INDIANA.

REGENERATOR MANIFOLD.

Application filed March 3, 1923. Serial No. 622,665.

This invention relates to a regenerator manifold and particularly to a manifold which is of such construction that fuel introduced thereinto is transformed into condition for more efficient utilization by an engine on which the manifold is mounted.

Fuels commonly used in hydrocarbon engines often contain percentages of lower grade hydrocarbon which necessitate the application of heat before they can be effectively used in the combustion chambers of the engines. This is particularly true of conditions existing at low engine speeds and it is desirable that more heat be applied at such speeds than at higher speeds of engine operation.

It is an object of the present invention to provide a manifold which will assure efficient utilization of low grade fuels at varying engine speeds.

It is a further object of this invention to provide a device of the kind described wherein the heat absorbed by the fuel is automatically controlled in accordance with the operation of the engine.

It is also an object of this invention to provide a manifold including means which are adapted to impart a turbulent motion to fuel mixture which enters the same and to increase the homogeneity of said fuel mixture.

It is an important object of this invention to provide a manifold of the class described which is efficient in operation, which may be economically manufactured and which may be readily applied to existing types of engines.

Other and further important objects of the present invention will be apparent from the disclosures in the specification and the accompanying drawings.

The invention (in a preferred form) is shown on the drawings and hereinafter more fully described.

On the drawings:

Figure 1 is a central vertical section, with parts shown in elevation, taken through a manifold embodying the principles of this invention.

Figure 2 is a fragmentary section on the line 2—2 of Figure 1, with parts shown in elevation.

Figure 3 is an enlarged fragmentary section on the line 3—3 of Figure 1, with parts shown in elevation.

As shown on the drawings:

The reference numeral 1 indicates a carbureter which may be of any suitable design and which, in the present instance, is provided with an elbow connection 2 secured thereto, said elbow connection 2 being in turn secured to an intake manifold 3 of usual construction and having an integral portion 4 extending into the center of said manifold 3 and adapted to discharge fuel mixture therein. The flow of fuel mixture through the connection 2 is controlled by a butterfly throttle valve 5 of usual construction, and it is, of course, to be understood that this throttle valve might be and often is placed in the outlet of the carbureter proper.

Fuel mixture from the manifold 3 is adapted to be introduced into the combustion chamber of the engine on which the manifold is mounted through passages 6 and through usual intake ports and the exhaust gases are discharged from the combustion chambers of the engine into a usual exhaust manifold 7 through passages or ports 8, 9, 10 and 11. These exhaust gases are conducted away from the manifold 7 through an opening 12 which communicates with a suitable exhaust pipe assembly, and as clearly shown in Figure 1, the exhaust manifold 7 is preferably cast as an integral part of the intake manifold, the passages or ports 9 and 10 being positioned directly beneath the central portion of the floor of said intake manifold 3. Integrally formed in the floor of the manifold 3 between the ports 9 and 10, and extending downwardly into the exhaust manifold 7, is a receptacle 13 which is adapted to receive less volatile fuels which are discharged from the extension 4, retaining the same where they are subject to the heat of the exhaust gases in the manifold 7 until they are properly volatilized. Integral shoulders 14 are formed in the floor of the manifold 3 at the mouth of the receptacle 13, and said shoulders 14 afford a seat for a rounded outwardly extending flange or lip 15 which is formed on the lower end of a sleeve 16 which is guided by and slidable upon the extension 4.

As will be noted from an examination of Figures 1 and 2, the shoulders 14 and the mouth of the receptacle 13 are so positioned relative to the flange 15 as to permit of a limited discharge of fuel mixture from the sleeve 16 into the manifold 3 and out through the passages 6. The flange 15 is seated on the shoulders 14 only at low engine speeds, and it will be apparent that fuel mixture discharged between said shoulders and beneath the flange 15 at such speeds is subjected to the high heat which is applied to the floor of the manifold 3 and the receptacle 13 by the heated exhaust gas from the ports 8, 9, 10 and 11. At higher engine speeds, the velocity of the flowing fuel due to the existing pressure difference is sufficient to lift the flange 15 and the sleeve 16 upwardly away from the shoulders 14, and consequently relatively less heat is applied to the fuel mixture discharged into the manifold 3 since the heated portions of said manifold are only those portions comprising the receptacle 13 and the partition or floor directly above and surrounding the ports 9 and 10.

Means are provided for increasing the turbulence of the fuel mixture flowing to the extension 4 and directing the same toward the axis of the sleeve 16, said means preferably comprising a spiral member 17 which is frictionally held inside the extension 4 and which may be conveniently formed from a piece of flat metal twisted into a spiral in proper form. I have found that the spiral member 17 operates efficiently when placed in the position shown in the drawings, but it is, of course, to be understood that the construction thereof may be varied to meet varying conditions and that any suitable fuel director and turbulator may be substituted for the spiral member 17.

The operation of the manifold of this invention will be obvious from the foregoing description. It will be noted that the receptacle 13 in effect acts as a regenerator by effecting the proper volatilization of less volatile fuels, the energy of which would have otherwise been lost. By transforming these less volatile fuels into condition to be utilized in the combustion chamber of the engine, the fouling of the combustion chamber and deterioration of lubricating oil in the crank case of the engine is greatly minimized. By providing the movable sleeve 16, it is possible to cause an absorption of heat by the fuel in the manifold 3 which is substantially in inverse proportion to the speed of the engine, and thus the desirable result of applying a large amount of heat at low engine speed and a lesser amount of heat at high engine speed, with proper intermediate heating, is assured.

As will be obvious, the manifold of this invention may be economically constructed with a minimum of machine work and the assembly thereof and installation on existing type hydrocarbon engines may be easily and quickly effected.

I am aware that numerous details of construction may be varied through a wide range without departing from the principles of this invention, and I therefore do not purpose limiting the patent granted, otherwise than necessitated by the prior art.

I claim as my invention:

1. The combination with a hydrocarbon engine and the intake and exhaust manifolds thereof, of a pocket opening into the intake manifold and projecting into the exhaust manifold, the pocket being aligned with the fuel mixture inlet to the intake manifold and velocity responsive means for automatically varying the deflection of the path of flow of the fuel mixture into the mouth of the pocket.

2. The combination with a hydrocarbon engine and the intake and exhaust manifolds thereof, of a receptacle communicating with the intake manifold and extending into the exhaust manifold, and a floating sleeve slidably mounted above the mouth of the receptacle for controlling the flow of fuel mixture therepast.

3. The combination with an internal combustion engine and the intake and exhaust manifolds thereof, of a cup-like hot spot formed between the manifolds in alignment with the inlet and the intake manifold and pneumatically operating means for varying the path of the fuel mixture relative to the hot spot in accordance with the velocity of the inflowing fuel mixture.

4. The combination with an intake manifold of a blind trap forming a vaporizer for liquid fuel disposed opposite the inlet to said manifold and means varying the path of the incoming fuel mixture relative to said vaporizer in accordance with variations in the quantity of the fuel mixture.

5. The combination with the inlet and exhaust manifolds of an internal combustion engine, of a receptacle extending from the inlet manifold into the exhaust manifold, a tube projecting into the intake manifold and directing the flow of the incoming fuel mixture into the receptacle, and a sleeve surrounding said tube and slidable thereon adapted to be automatically lifted by an increase in the velocity of the mixture to change the path thereof.

In testimony whereof I have hereunto subscribed my name.

WILLIAM S. CARLSTON.